United States Patent
Haggard (12)

(10) Patent No.: US 6,631,872 B1
(45) Date of Patent: Oct. 14, 2003

(54) PARACHUTE TRAJECTORY CONTROL

(76) Inventor: Roy A. Haggard, 19335 Jarrell Ct., Nuevo, CA (US) 92567

(*) Notice: Subject to any disclaimer, the term of this patent is extended or adjusted under 35 U.S.C. 154(b) by 0 days.

(21) Appl. No.: 10/118,914

(22) Filed: May 15, 2002

(51) Int. Cl.[7] ............................................. B64D 17/34
(52) U.S. Cl. .................................................... 244/152
(58) Field of Search ..................... 244/151 R, 151 A, 244/152

(56) References Cited

U.S. PATENT DOCUMENTS 2,610,008 A * 9/1952 Smith ........................ 244/152
5,678,788 A * 10/1997 Hetzer et al. ................ 244/152
5,901,924 A * 5/1999 Strieber ........................ 244/13

* cited by examiner

Primary Examiner—Robert P. Swiatek
(74) Attorney, Agent, or Firm—F. C. Price

(57) ABSTRACT

A control for a parachute trajectory is based on upward tipping of the canopy or by later righting a tipped position by upward movement of a different part of the canopy and then possibly tipping a different position upward, all a function of the needed parachute movement in some horizontal direction, and all achieved by paying out the length of selected risers around the canopy. All control physical action is based on paying-out various riser lengths. Only braking of the pay-out reels is involved. No shortening or reeling-in of lines and no power for such is involved in this light-weight control system.

1 Claim, 3 Drawing Sheets

Ruth PARACHUTE TRAJECTORY CONTROL

REFERENCES CITED

U.S. Patent Documents
U.S. Pat. No. 6,131,856 Oct. 17, 2000 Brown 244/152
U.S. Pat. No. 2,483,088 September 1949 DeHaven 254/93 R
U.S. Pat. No. 2,730,317 January 1956 Onanian 244/152
U.S. Pat. No. 3,823,600 July 1974 Wolff 73/12
U.S. Pat. No. 4,127,246 November 1978 Andres 2441138 R
U.S. Pat. No. 4,722,497 February 1988 Stanford 244/152
U.S. Pat. No. 5,021,064 June 1991 Caines 633/26
U.S. Pat. No. 5,080,305 January 1992 Stencel 244/152
U.S. Pat. No. 5,393,016 February 1995 Howard 244/138 R
U.S. Pat. No. 5,678,788 October 1997 Hetzer 244/152
U.S. Pat. No. 5,909,859 June 1999 Janicki 244/153 A No Federally sponsored research or development funds were used in the creation of the material of this application.

BACKGROUND OF THE INVENTION

Control of the horizontal vector of a descending parachute is not new. A known method uses a tilting of the canopy by changing the distance from the load to a confined region of the canopy perimeter. Typically, the canopy shape is changed by the controls as a change in the trajectory is needed in an attempt to refine the trajectory to a specific target point. Inevitably, in the previously available control systems this means that various lines around the perimeter of the parachute are controlled to have their lengths shortened and lengthened as directed by the control system. Thus, lines are alternately shortened and lengthened by the control signals as the control system changes the aim of the trajectory to suit a given instant status that is less than perfect. The shortening of lines inevitably involves power as the change is made under considerable tension. Various power means are proposed in the patent literature.

DETAILED DESCRIPTION OF THE INVENTION

The suspension lines that are spaced around a parachute canopy are divided into three or more adjacent groups, each group attaching to equal arc segments of the canopy. The lines of each group are fastened together at their bottom end with a connector to a suspension strap. Each strap can be lengthened as it is paid-out from a containing reel. The reels of all the straps are mounted on a central structure that normally contains the guidance controls. Braking means is used to allow rotation of the reel and payout of each strap as directed by the control unit that develops signals in accordance with the needs to control the descending parachute. The parachute will move away from the direction of lengthened straps that allow the canopy segment to tilt upward. Similarly, the parachute will cease to move in a given direction if reels are paid out to eliminate the tilt of the parachute in that direction by equalizing the length of all straps.

A payload harness connects the payload to the control unit. However, the control computer is mounted anywhere within the system—on the payload, for example. In any case there is a grouping of payout reels and whatever that grouping configuration, the base for the grouping is connected to the payload.

Figure 1:
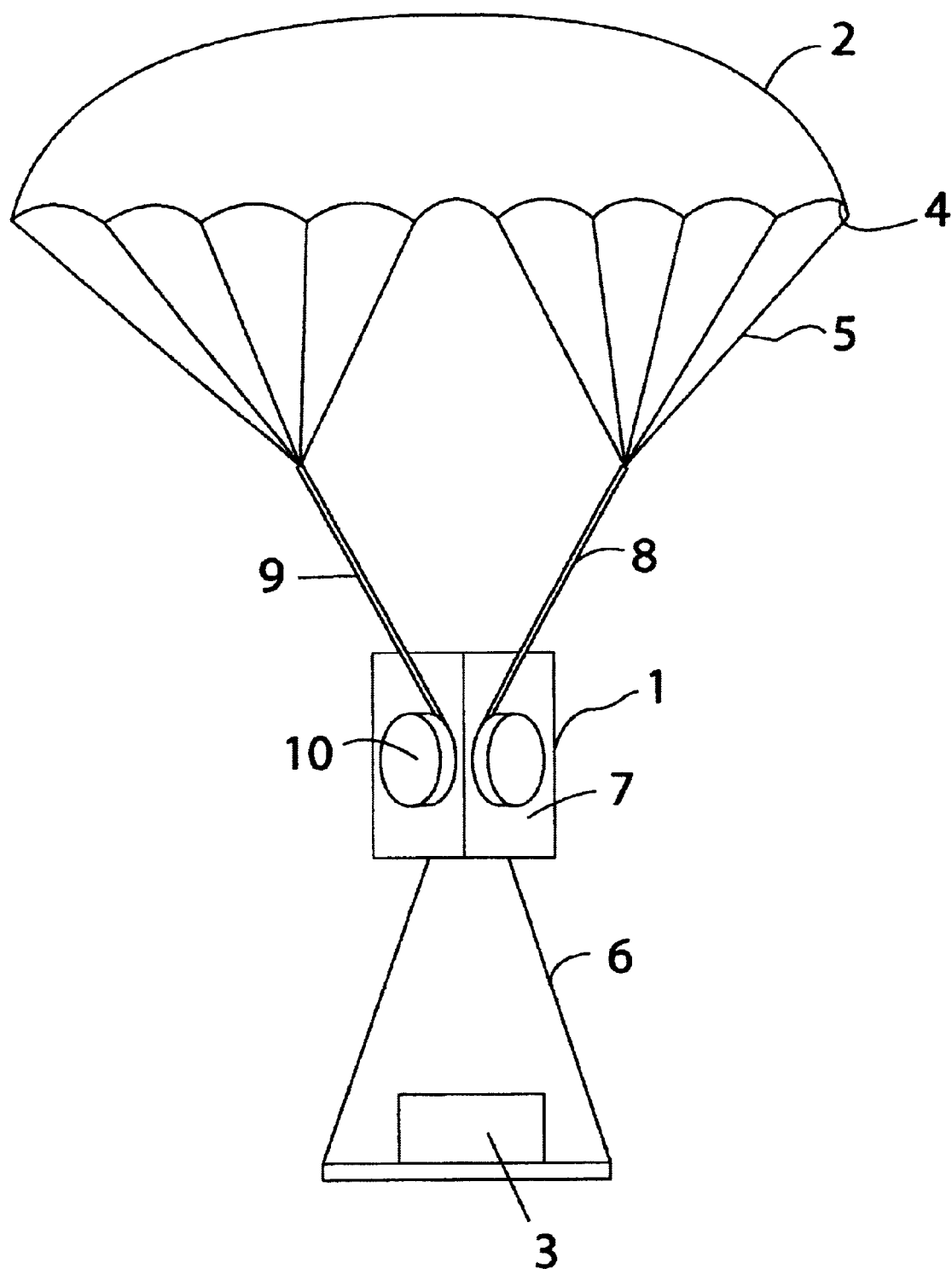
FIG. 1 shows an elevation view of a parachute with a trajectory control system and load, the detail showing, for clarity, only the near half of the parachute lines and load lines.

In FIG. 1 is seen a parachute trajectory control system 1 with a parachute 2 and a load 3 connected. Conventional aspects are the canopy skirt 4, the suspension lines 5 and the payload risers 6. The control components are the control housing 7 for a flight computer, including its GPS receiver and its control computer. Other control components are the pay-out webbing 8 and 9 that increases in length to tilt the parachute and change the direction of its horizontal motion as controlled by the webbing pay-out reel 10. A lengthening of webbing 9 would tilt the canopy toward the right in the figure and cause the entire system to move in that direction. Any one, two, or three webbings in this four-webbing system might be lengthened by a given flight control signal generated within the control housing 7. Flight directional control is only achieved by paying-out one or more webbed risers. There is no component in the system for reeling-in the webbing; it only reels out.

Figure 2:
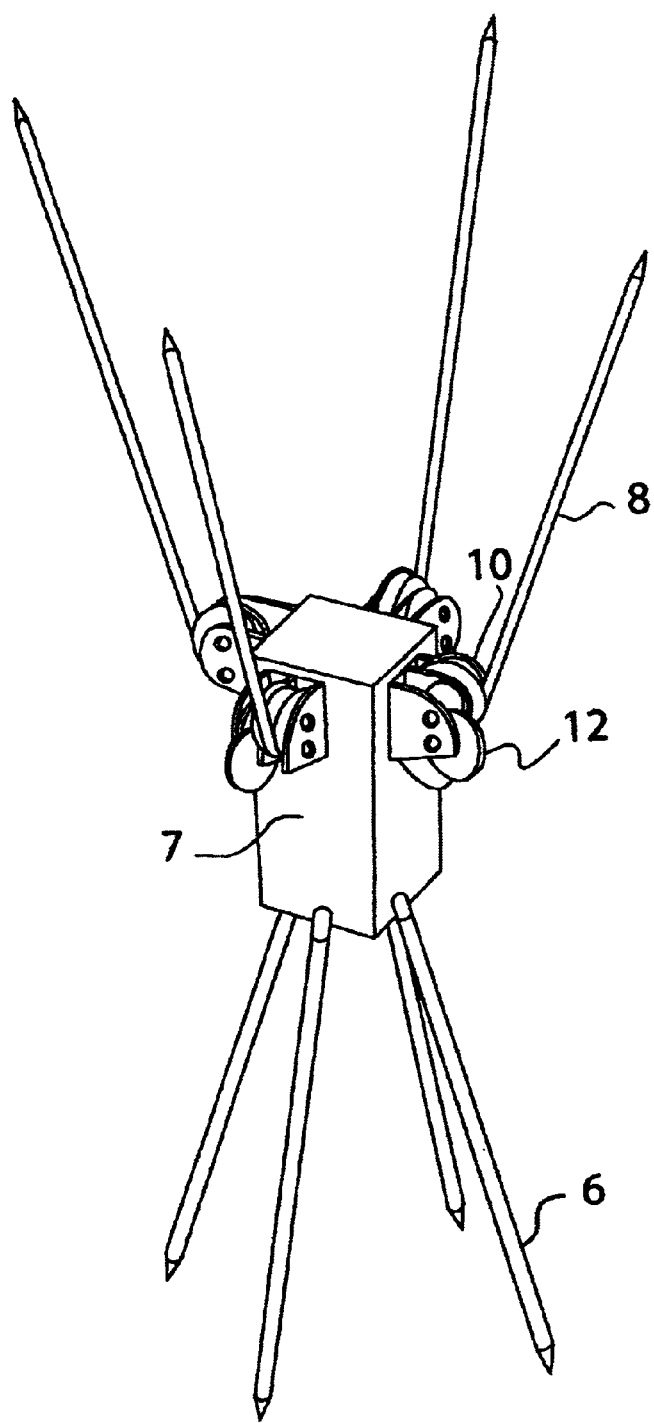
FIG. 2 is an isometric view of the flight control system, including actuators that pay-out riser lines from reels and including lines to the load from the system.

In FIG. 2 is seen the detail of the webbing payout means. The webbing 8 is paid out from reel 10 upon the action of the disc brake 12. There is a mechanical linkage between the reel 10 and the brake 12. Commercial parts that can be used here include an automotive electric brake caliper by Delphi and an industrial spring-applied, electrically released caliper by Twiflex Corporation.

Control riser webbing is stored on a drum and paid out under the control of the disc brake. The webbing can be Mi-T-87130 Type X Class 13 with a breaking strength of 20,000 pounds. It is 1.75 inches wide and 0.090 inches think. Forty feet of such webbing wrapped on a 6-inch drum will be approximately 1.8 inches think for a loaded diameter of 9.6 inches. A typical 6-inch drum with 10-inch diameter flanges can be controlled by a 12-inch disc brake through a pair of spur gears. The gears "back-drive" the brake, allowing a light brake to control a heavy dynamic load.

Figure 3:
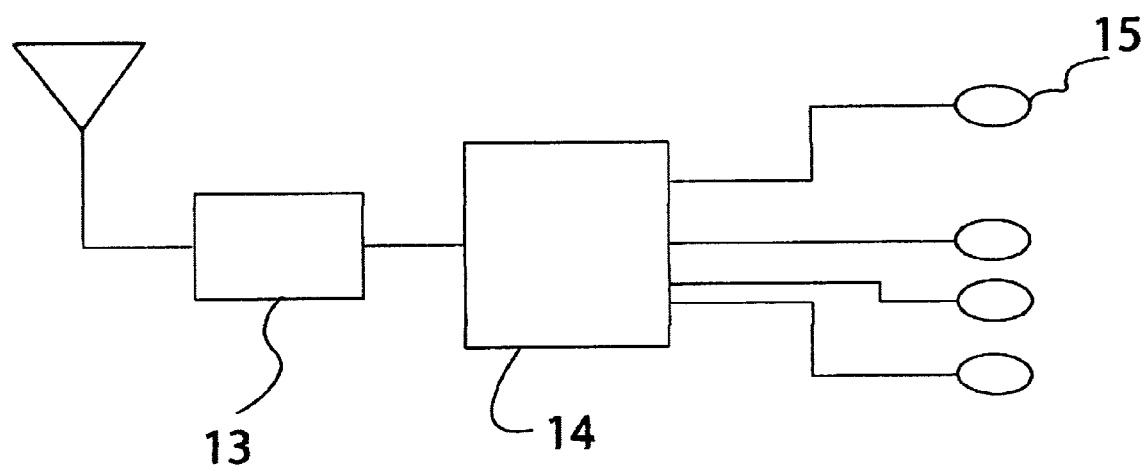
FIG. 3 is a schematic drawing of the control system

FIG. 3 shows schematically the basic components of the control system. The GPS receiver 13 furnishes to the trajectory control computer 14 all necessary data on the parachute's position and movement. The computer, having been programmed to seek a given destination, then signals the required brake calipers 15 to payout the desired webbing length or lengths to modify the trajectory of the parachute.

Trajectory control is needed for two reasons: to correct for release point error, and to correct for wind. Once on the planned trajectory, the system must have the control authority to stay on trajectory as winds tend to blow it off. The risers, as a group, get progressively longer with each control action.

The basic principle of this invention for parachute trajectory control applies when any of the following are involved in the system for guidance with controlled pay-out of lines between the load and the parachute canopy and where only line pay-out is the physical control step: various methods of releasing additional line length and of holding a line to a given length, various types of lines being paid-out such as ropes, cables, wires, and woven strips or ribbons, different numbers of groups of support lines around the parachute perimeter, various control systems for determining the course corrections for the parachute and various locations for the processor that sends signals for line pay-out, these locations being anywhere between the canopy and the bottom of the load with lines or radio signals for sending messages to the pay-out mechanisms from the processor.

I claim:

1. A trajectory-controlling system for a descending parachute, comprising:

a canopy and suspension lines leading to a payload, said suspension line being spaced around the periphery of said canopy, said payload having a supporting harness, said periphery being divided into three or more equal arc segments, said suspension lines being divided into a number of groups equal to the number of said segments, each said group comprising all of the suspension lines with upper attachments within a particular segment of said periphery, the lower ends of said lines in each said group being fastened together at a connector, each said connector connecting to one suspension strap;

said payload harness having upper and lower ends, said lower ends of said harness connecting to said payload;

multiple strap pay-out control actuators, one such actuator for each said group of suspension lines, each said actuator comprising a spool, a brake assembly, and mechanical transmission means connecting said spool with said brake, each said spool having one said suspension strap wound onto it, said payout actuators being mounted to a central structure, said central structure providing a means to connect said actuators, collectively, to said upper ends of said payload harness;

guidance means and actuator power means, said guidance means directing said actuators' said brake assemblies selectively to control payout of one or more of said suspension straps, said controlled payout causing one side of said canopy to rise higher than the remainder of said canopy and resulting in horizontal motion of said parachute system, said guidance means also, according to its programming, directing said actuators for straps not having been lengthened to pay out said previously unlengthened suspension straps such that all straps are once again of equal length, stopping said horizontal motion, and thus, by selectively lengthening suspension straps to control horizontal motion, said system controls the trajectory of said parachute and of said payload.

\* \* \* \* \*